Patented July 25, 1944

2,354,417

UNITED STATES PATENT OFFICE 2,354,417

ACIDULATED GRASS OR LEGUMINOUS FODDER WITH NONTOXIC CORROSION INHIBITOR

Edwin Cox, Richmond, Va., assignor to Virginia-Carolina Chemical Corporation, Richmond, Va., a corporation of Virginia No Drawing. Original application April 1, 1940, Serial No. 327,363. Divided and this application May 4, 1943, Serial No. 485,679

10 Claims. (Cl. 99—8)

This invention relates to the treatment of grass or leguminous fodder crops while in the green or uncured state, adapting them to preservation in the form of ensilage. Such crops are ordinarily deficient in their ability to support desirable lactic acid fermentation, rendering them unsuited for ensilage in the absence of treatment, since not enough lactic acid fermentation develops in the silo to inhibit proteolytic fermentation, which results in spoiled and malodorous ensilage, rendering it definitely unwholesome as feed.

In preserving foodstuffs for animals, current attention is being given to the problem of preparing ensilage from grasses or from alfalfa, soya, etc. This may be designated as grass and leguminous ensilage to distinguish from ensilage from cornstalks. This type of ensilage has high nutritive value in proteins and vitamins, but requires for its preservation the addition of acid substances or materials that form acids, for the purpose of inhibiting proteolytic fermentation.

The general object of the present invention is to incorporate with green uncured grass or leguminous fodder, a constituent comprising a non-toxic acid that will not interfere with desirable bacterial processes, but which will suppress proteolytic fermentation, said acid constituent being combined with a corrosion inhibitor for the acid which is also non-toxic in the small proportion in which it is used in the preservation of silage, and which at the same time will not impede the development of desirable lactic acid fermentation in the ensilage, and the purpose of which inhibitor is to prevent corrosion by the acid of the metal parts of the ensilage cutter or other metallic parts of the ensilage preparing apparatus with which the treated fodder may come into contact.

More specifically, the object of the invention is to treat green uncured grass or leguminous fodder with phosphoric acid, the corrosive action of which towards metal is inhibited by the presence of aliphatic amines.

The invention includes the process of treating the fodder, and the new product resulting from the process. This application is a division of my co-pending application Ser. No. 327,363, filed April 1, 1940.

In accordance with this invention a relatively small quantity of an amine is introduced into a relatively large body of phosphoric acid, reacting with some of the acid to provide what is assumed to be amine phosphate. This salt remains stable in solution in the uncombined acid and acts as a corrosion inhibitor for the same. This corrosion inhibited phosphoric acid is usefully applied to the green uncured grass and leguminous fodder to provide an ensilage in which the desirable bacterial action which takes place in the silo under acid conditions of the fodder is promoted, the undesirable proteolytic fermentation inhibited, the treated phosphoric acid being inert toward the metal containers used for the acid and on the equipment employed to chop and handle the fodder into the silo. The resultant ensilaged product is non-toxic to the animals that consume it, free from bad odor or taste which would cause the animals to reject it, and which produces no distasteful or malodorous qualities in milk from herds to which said ensilage is fed.

The fodder acidulating and corrosive inhibiting composition of the subject invention comprises phosphoric acid preferably containing aliphatic amines in which the aliphatic groups may contain from 4 to 6 carbon atoms. Specifically preferred are the tertiary or tri-amines of such compounds. These are designated as butyl amine, amyl amine and hexyl amine, and preferably comprise both normal and iso-compounds.

It is within the scope of this invention to combine with phosphoric acid an amine in which one of these aliphatic groups may be contained with one or more of the others of these aliphatic groups. Thus, for example, there may be a butyl group and two amyl groups or two amyl groups and a hexyl group or such other combinations as may be selected, but preferably the amine is a tri-amine and the aliphatic group may be in part of the iso-form. Particularly preferred is triamylamine containing iso-triamylamine. The concentration of triamylamine in phosphoric acid, for example, may range from about .01 to 1% and the concentration of other amines will be generally of the same order. In a further description of this invention triamylamine will be taken as illustrative of the other amines mentioned or combinations thereof when utilized with phosphoric acid.

Commercial phosphoric acid manufactured by the wet process contains various small amounts of fluorine compounds and is consequently more corrosive toward metals than technical phosphoric acid. In the case of commercial phosphoric acid, it is advantageous to include 0.3% to 1% of triamylamine with the phosphoric acid. On the other hand, technical phosphoric acid, which is relatively free from fluorine compounds, may contain less than 0.5% triamylamine. These proportions may vary. By way of specific example, a satisfactory composition results from technical phosphoric acid containing 0.2% n-triamylamine, and from commercial phosphoric acid containing 0.3% n-triamylamine. The trace of fluorine which might be present in the treated silage is so small as to be negligible from the standpoint of toxicity.

Also, in this description the term triamylamine includes not only n-triamylamine but also iso-triamylamine. In fact, the use of mixtures of n-triamylamine with iso-triamylamine is preferable to that of pure n-triamylamine. To some degree, instead of the tri-substituted amine, the mono- or the di-substituted amylamines may form useful compositions in phosphoric acid.

When this composition comprising phosphoric acid is contained in grass or legume ensilage, desirable bacterial action proceeds.

In treating the ensilage, the amine phosphate composition is preferably diluted with three or four times its volume of water and introduced in the form of a small stream in the blower of the ensilage cutter, where it comes, well distributed, into contact with the comminuted fodder. The ratio of the amine phosphate composition to the weight of silage is not critical. It may vary from 9 to 11 pounds per ton of silage in the case of grasses, to from 16 to 23 pounds per ton in the case of legumes such as alfalfa or clover, while with respect to soy beans, the ratio may be somewhat greater.

What I claim as my invention is:

1. Acidulated ensilage comprising ensilage of the grass or leguminous type containing for each ton of ensilage approximately 9 to 23 lbs. of a composition of phosphoric acid and an aliphatic amine in which the aliphatic group contains from four to six carbon atoms.

2. Acidulated ensilage comprising ensilage of the grass or leguminous type containing for each ton of ensilage approximately 9 to 23 lbs. of a composition of phosphoric acid and triamylamine.

3. Acidulated ensilage comprising ensilage of the grass or leguminous type containing for each ton of ensilage approximately 9 to 23 lbs. of a composition of phosphoric acid and an aliphatic amine in which aliphatic groups contain from four to six carbon atoms in which at least one of the aliphatic groups is of iso-form.

4. Acidulated ensilage comprising ensilage of the grass or leguminous type containing for each ton of ensilage approximately 9 to 23 lbs. of a composition of phosphoric acid and iso-triamylamine.

5. Composition of matter comprising ensilage of the grass or leguminous type containing phosphoric acid and amylamine in which the amylamine is from about 0.01% to 1% the weight of the phosphoric acid.

6. Acidulated ensilage comprising ensilage of the grass or leguminous type containing for each ton of ensilage approximately 9 to 23 lbs. of a composition of phosphoric acid and n- and iso-triamylamine.

7. Composition of matter comprising ensilage of the grass or leguminous type containing phosphoric acid and n- and iso-triamylamine in which the triamylamines are from about 0.05% to 0.5% the weight of the phosphoric acid.

8. Process for fortifying silage of the grass or leguminous type against proteolytic fermentation and stimulating lactic acid fermentation comprising acidulating the silage with a composition of phosphoric acid, incorporating triamylamine as a corrosive inhibitor in proportion of approximately 9 to 23 lbs. of acidulating composition to one ton of ensilage.

9. Composition of matter comprising ensilage of the grass or leguminous type containing phosphoric acid and triamylamine in which the triamylamine is from about 0.01% to 1% the weight of the phosphoric acid.

10. Acidulated ensilage comprising ensilage of the grass or leguminous type containing a composition of phosphoric acid and triamylamine in an amount substantially to inhibit proteolytic fermentation of ensilage.

EDWIN COX.